United States Patent
Hattori et al.

(10) Patent No.: US 11,472,313 B2
(45) Date of Patent: Oct. 18, 2022

(54) VEHICLE SEAT

(71) Applicant: TOYOTA BOSHOKU KABUSHIKI KAISHA, Aichi (JP)

(72) Inventors: Takashi Hattori, Aichi (JP); Yoshiyuki Kumazaki, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 50 days.

(21) Appl. No.: 16/774,623

(22) Filed: Jan. 28, 2020

(65) Prior Publication Data

US 2020/0247279 A1   Aug. 6, 2020

(30) Foreign Application Priority Data

Feb. 1, 2019   (JP) .............................. JP2019-017347

(51) Int. Cl.
*B60N 2/08* (2006.01)
*B60N 2/30* (2006.01)

(52) U.S. Cl.
CPC ......... *B60N 2/0881* (2013.01); *B60N 2/0843* (2013.01); *B60N 2/3009* (2013.01); *B60N 2/3045* (2013.01)

(58) Field of Classification Search
None
See application file for complete search history.

(56) References Cited

U.S. PATENT DOCUMENTS

| | | | |
|---|---|---|---|
| 6,935,691 B1* | 8/2005 | Sasaki ................. | B60N 2/0812 248/421 |
| 2008/0122279 A1* | 5/2008 | Park .................... | B60N 2/0875 297/332 |
| 2011/0241401 A1* | 10/2011 | Otsuka ................ | B60N 2/3013 297/331 |
| 2021/0405681 A1* | 12/2021 | Ploch .................. | B60N 2/3045 |

FOREIGN PATENT DOCUMENTS

| | | | |
|---|---|---|---|
| JP | 2005-022551 | 1/2005 | |
| JP | 2005022550 A | 1/2005 | |
| WO | WO-2008029947 A1 * | 3/2008 | ............. B60N 2/305 |

OTHER PUBLICATIONS

Notice of reasons for refusal dated May 31, 2022 in the counterpart Japanese patent application No. 2019-017347 and machine-generated English translation.

* cited by examiner

*Primary Examiner* — David E Allred
(74) *Attorney, Agent, or Firm* — Greenblum & Bernstein, P.L.C.

(57) ABSTRACT

A vehicle seat in the present disclosure includes a seat cushion; a seatback; a sliding device configured to slidably support a seat main body that includes the seat cushion and the seatback; a first locking mechanism configured to restrict a sliding movement of the seat main body when the seat cushion and the seatback are placed in an occupiable state; a tip-up mechanism configured to rotationally displace the seat cushion in conjunction with a frontward tilting movement of the seatback; and a second locking mechanism (Continued)

configured to restrict a sliding movement of the seat main body when an elevation angle of the seat cushion exceeds a preset angle by an operation of the tip-up mechanism.

4 Claims, 7 Drawing Sheets

VEHICLE SEAT

CROSS-REFERENCE TO RELATED APPLICATIONS

This application claims the benefit of Japanese Patent Application No. 2019-017347 filed on Feb. 1, 2019 with the Japan Patent Office, the entire disclosure of which is incorporated herein by reference.

BACKGROUND

The present disclosure relates to a vehicle seat configured to be mounted to a vehicle.

For example, a vehicle seat disclosed in Japanese Unexamined Patent Application Publication No. 2005-022551 (Patent Document 1) includes a function to largely displace a seat main body frontwards by sliding. When this function (hereinafter also referred to as long-slide function) is active, a tip-up function for rotationally displacing a seat cushion upwardly from an occupiable position is activated in conjunction with an operation of largely tilting the seat cushion frontwards.

The invention disclosed in Patent Document 1 includes a locking mechanism for restricting the sliding movement of the seat main body when the seat main body has slid to a frontmost end/limit in response to the activation of the long-slide function. This restriction by the locking mechanism is removed when the seatback is placed back to an occupiable state from the tilted state.

SUMMARY

In the invention disclosed in Patent Document 1, the restriction by the locking mechanism is removed when a large load, caused by the sliding movement of the seat main body to the frontmost end/limit, brings the seatback to the occupiable state.

Preferably, the present disclosure provides a vehicle seat configured to inhibit such removal of the restriction by the locking mechanism when the seat main body largely slides frontwards.

Desirably, a vehicle seat mounted to a vehicle comprises, for example, at least one of the following configuration requirements.

One configuration requirement is a seat cushion configured to support the buttocks of an occupant. The seat cushion is configured to rotate in up-down directions about its rear end. Another configuration requirement is a seatback configured to support the back of the occupant. The seatback is configured to rotate in front-rear directions about its lower end. Another configuration requirement is a sliding device configured to slidably support a seat main body that includes the seat cushion and the seatback. Another configuration requirement is a first locking mechanism configured to be located on the sliding device and restrict a sliding movement of the seat main body when the seat cushion and the seatback are placed in an occupiable state. Another configuration requirement is a tip-up mechanism configured to rotationally displace the seat cushion upwardly from an occupiable position in conjunction with a frontward tilting movement of the seatback. Another configuration requirement is a second locking mechanism configured to be located on the sliding device and restrict a sliding movement of the seat main body when an elevation angle of the seat cushion exceeds a preset angle by an operation of the tip-up mechanism.

In the vehicle seat, these configuration requirements help inhibit removal of the restriction of the second locking mechanism when the seatback is placed in the occupiable state.

The vehicle seat may be configured as below.

Desirably, the sliding device comprises a fixed rail, and a movable rail to which the seat main body is fixed and is configured to be slidable with respect to the fixed rail. Desirably, the second locking mechanism comprises a second locking member configured to be displaced between an engaged position, which is for an engagement with the movable rail and the fixed rail, and a disengaged position where the engagement is released; a spring configured to exert an elastic force acting to displace the locking member towards the engaged position; and a lock-control member configured to be located in the seat cushion, displace the locking member to the disengaged position when the seat cushion is placed in the occupiable position, and allow the locking member to be placed in the engaged position when the elevation angle of the seat cushion exceeds the preset angle.

Accordingly, in the vehicle seat, removal of the restriction of the second-locking mechanism is inhibited when the seatback is placed in the occupiable state.

BRIEF DESCRIPTION OF THE DRAWINGS

Example embodiments of the present disclosure will be described hereinafter with reference to the accompanying drawings, in which.

DETAILED DESCRIPTION OF THE PREFERRED EMBODIMENTS

Figure 1:
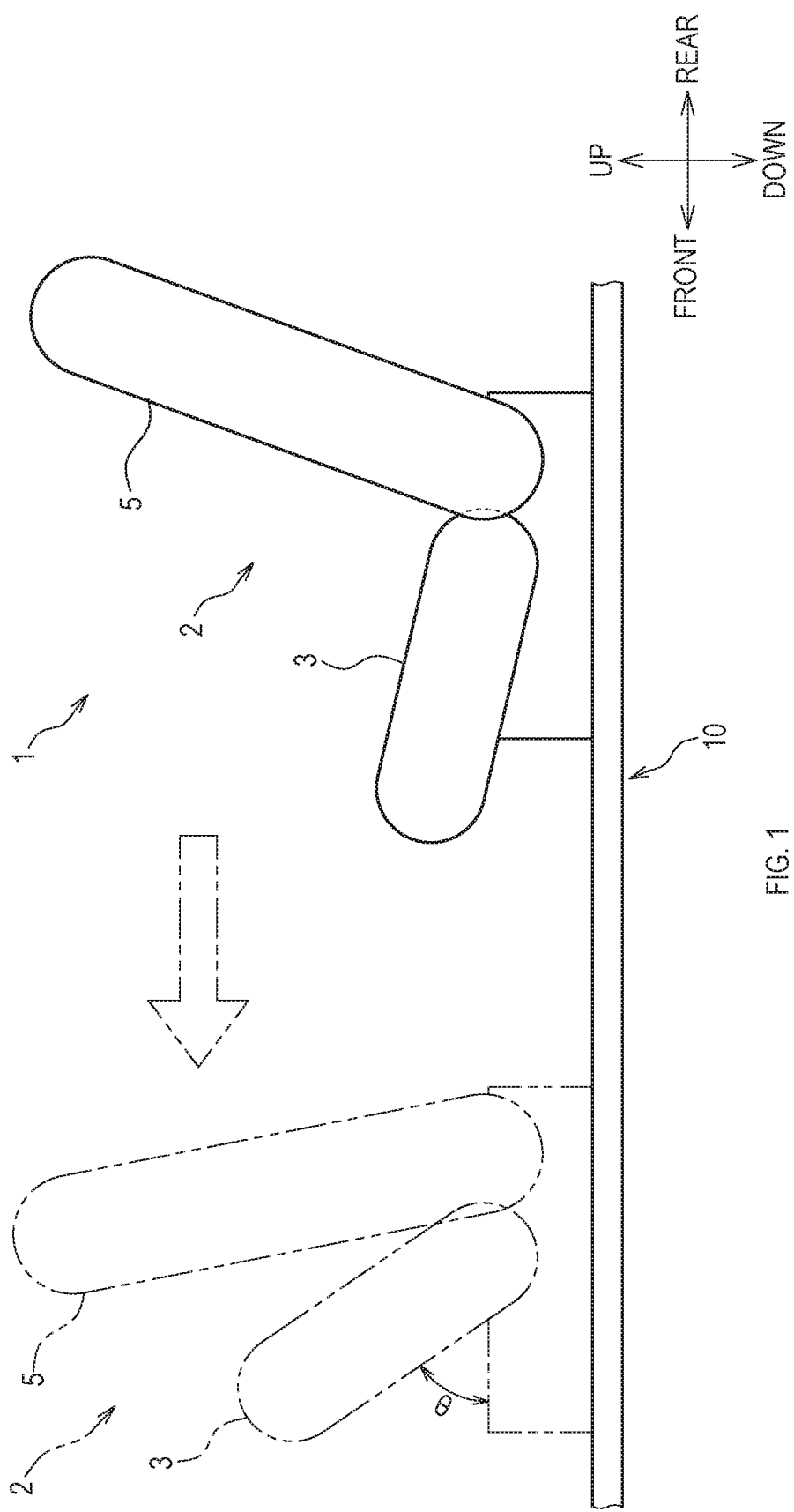
FIG. 1 is a conceptual diagram of a vehicle seat.

Embodiments explained hereinafter show examples of embodiments that belong to the technical scope of the present disclosure. Matters to specify the invention recited in the claims are not limited to specific configurations and structures that are shown in the embodiments explained hereinafter.

In respect of a member or portion explained with at least a reference numeral, there is at least one in number of such a member or portion unless the number is otherwise specified as "only one of" and the like. In other words, there may be two or more of such a member or portion when the number is not specified as "only one of" and the like.

The present embodiments are examples of a seat (hereinafter referred to as vehicle seat) configured to be mounted to a vehicle such as a car. Arrows and the like indicating directions in the drawings are made for easy understanding of relationship between the drawings.

Accordingly, the invention of the present disclosure should not be limited by the directions shown in the drawings. The directions in the drawings are defined in relation to the vehicle seat according to the present embodiments assembled to a vehicle.

1. Outline of Vehicle Seat

As shown in FIG. 1, a vehicle seat 1 comprises at least a seat main body 2 and a sliding device 10. The seat main body 2 comprises at least a seat cushion 3 and a seatback 5.

The seat cushion 3 is a portion for supporting the buttocks of the occupant. The seat cushion 3 is rotatable about its rear end in up-down directions. More specifically, the seat cushion 3 is rotationally displaceable between a solid-lined state and a two-dot-chain lined state shown in FIG. 1.

The seatback 5 is a portion for supporting the back of the occupant. The seatback 5 is rotatable about its lower end in front-rear directions. More specifically, the seatback 5 is rotationally displaceable between the solid-lined state and the two-dot-chain lined state shown in FIG. 1.

Hereinafter, the seat main body 2 in the solid-lined state in FIG. 1 is called an occupiable state, and the seat main body 2 in the two-dot-chain lined state in FIG. 1 is called a walk-in-ready state. In the walk-in-ready state, the seatback 5 is tilted further frontwards than its position in the occupiable state; and the seat cushion 3 is rotationally displaced further upwards than its position in the occupiable state.

Figure 2:
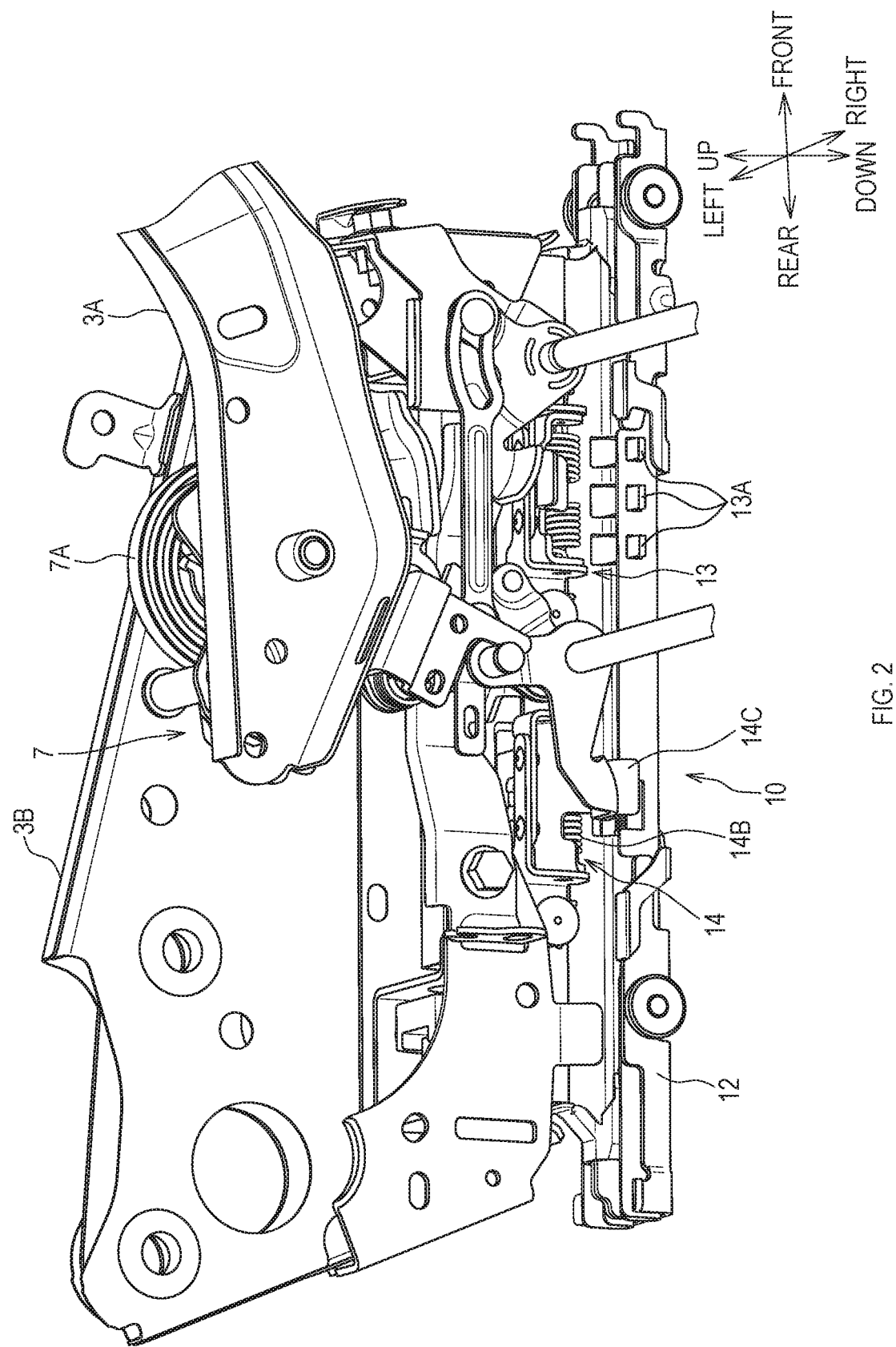
FIG. 2 is a diagram showing a sliding device.
Figure 3:
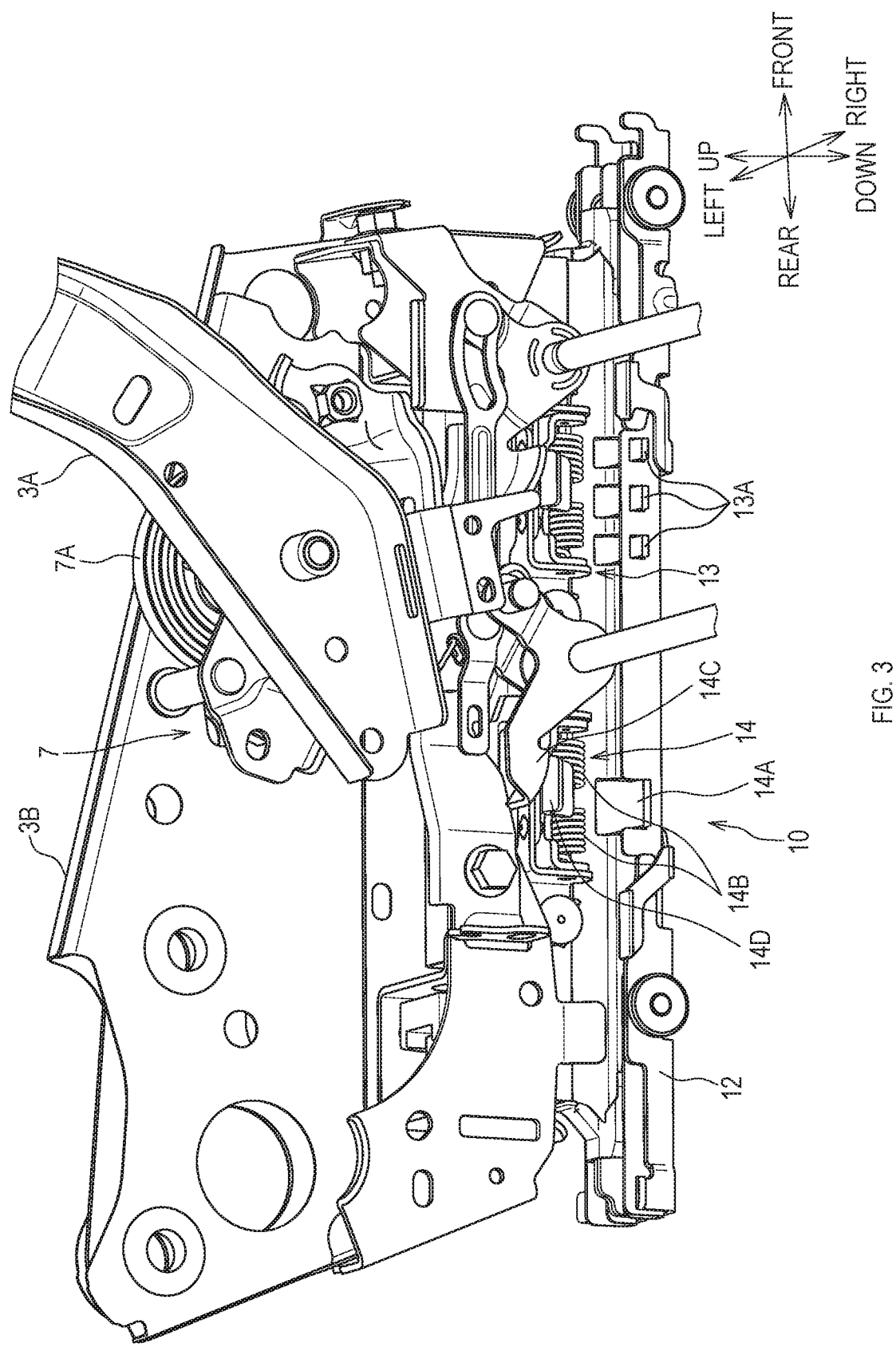
FIG. 3 is a diagram showing the sliding device.

The sliding device 10 is a mechanism for supporting the seat main body 2 slidable in the front-rear directions. As shown in FIG. 2 and FIG. 3, the seat main body 2 comprises a tip-up mechanism 7.

The tip-up mechanism 7 is operated when the seat main body 2 moves from the occupiable state to the walk-in-ready state. More specifically, the tip-up mechanism 7 rotationally displaces a lower arm 3A from an occupiable position (see FIG. 2) to a walk-in position (see FIG. 3) in conjunction with a frontward movement of the seatback 5.

The lower arm 3A is a part of a framework of the seat cushion 3. In other words, the tip-up mechanism 7 exerts at least a function to rotationally displace the lower arm 3A from the occupiable position to the walk-in position.

The lower arm 3A is rotatably coupled to a seat side frame 3B. The seat side frame 3B is included in a framework of the seat main body 2. The seatback 5 is rotatably coupled to a rear end of the seat side frame 3B.

The tip-up mechanism 7 according to the present embodiment comprises a spiral spring 7A, and rotationally displaces the seat cushion 3 from the occupiable position to the walk-in position by an elastic force of the spiral spring 7A.

In other words, the spiral spring 7A causes the elastic force, which is for displacing the seat cushion 3 in the occupiable position towards the walk-in position, to act on the seat cushion 3. The tip-up mechanism 7 thus comprises a retaining mechanism (not shown) to resist the elastic force and retain the seat cushion 3 in the occupiable position.

The seatback 5 comprises a manipulation part (not shown) at its upper portion (in the present embodiment, shoulder portion). The manipulation part is for bringing the seat main body 2 into the walk-in-ready state. When a user manipulates the manipulation part, the retention by the retaining mechanism is released and the seatback 5 is tilted. The seat main body 2 is accordingly placed in the walk-in-ready state.

2. Details of Sliding Device

<Outline of Sliding Device>

As shown in FIG. 4 to FIG. 7, the sliding device 10 comprises at least a fixed rail 11, a movable rail 12, a first locking mechanism 13, and a second locking mechanism 14.

The fixed rail 11 is a member fixed to the vehicle. The movable rail 12 is a member to which the seat main body 2 (in the present embodiment, the seat side frame 3B) is fixed and is slidable relative to the fixed rail 11.

The first locking mechanism 13 restricts a sliding movement of the seat main body 2 when the seat main body 2 is placed in the occupiable state. The second locking mechanism 14 restricts the sliding movement of the seat main body 2 when an elevation angle θ (see FIG. 1) of the seat cushion 3 exceeds a preset angle by an operation of the tip-up mechanism 7.

<First Locking Mechanism>

Figure 6:
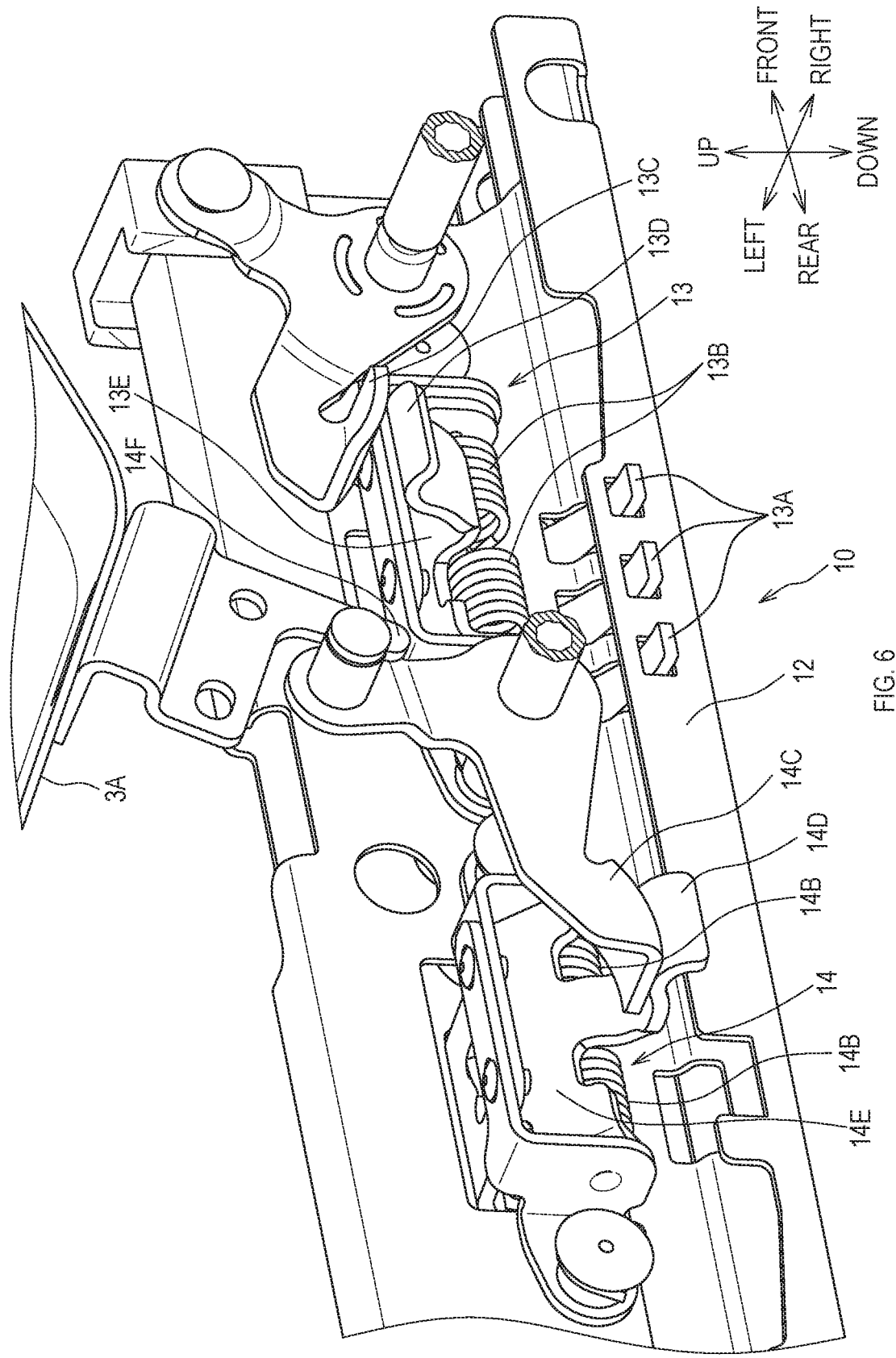
FIG. 6 is a diagram showing a first locking mechanism and the second locking mechanism.

As shown in FIG. 6, the first locking mechanism 13 comprises at least one locking member 13A (in the present embodiment, two or more locking members 13A), at least one spring 13B (in the present embodiment, two or more springs 13B), a release lever 13C, and a pressed portion 13D.

The locking members 13A are displaceable between a first engaged position for engagement with the movable rail 12 and the fixed rail 11 and a first disengaged position where the engagement is released. The springs 13B exert elastic forces to displace the locking members 13A towards the first engaged position.

The release lever 13C is displaceable between a first pressing position for pressing the pressed portion 13D and a first separated position spaced apart from the pressed portion 13D. The pressed portion 13D is formed on a movable member 13E where the locking members 13A are formed.

The locking members 13A are displaced into the first disengaged position when the pressed portion 13D is pressed by the release lever 13C. The locking members 13A are placed back to the first engaged position by the elastic forces of the springs 13B when the release lever 13C is moved apart from the pressed portion 13D.

The release lever 13C is manipulated by the user via a manipulation member (not shown), such as a link and a manipulation cable. In other words, the first locking mechanism 13 is placed in a locked state to restrict the sliding movement of the seat main body 2 in a state where no operation force is acting on the manipulation member.

<Second Locking Mechanism>

Figure 7:
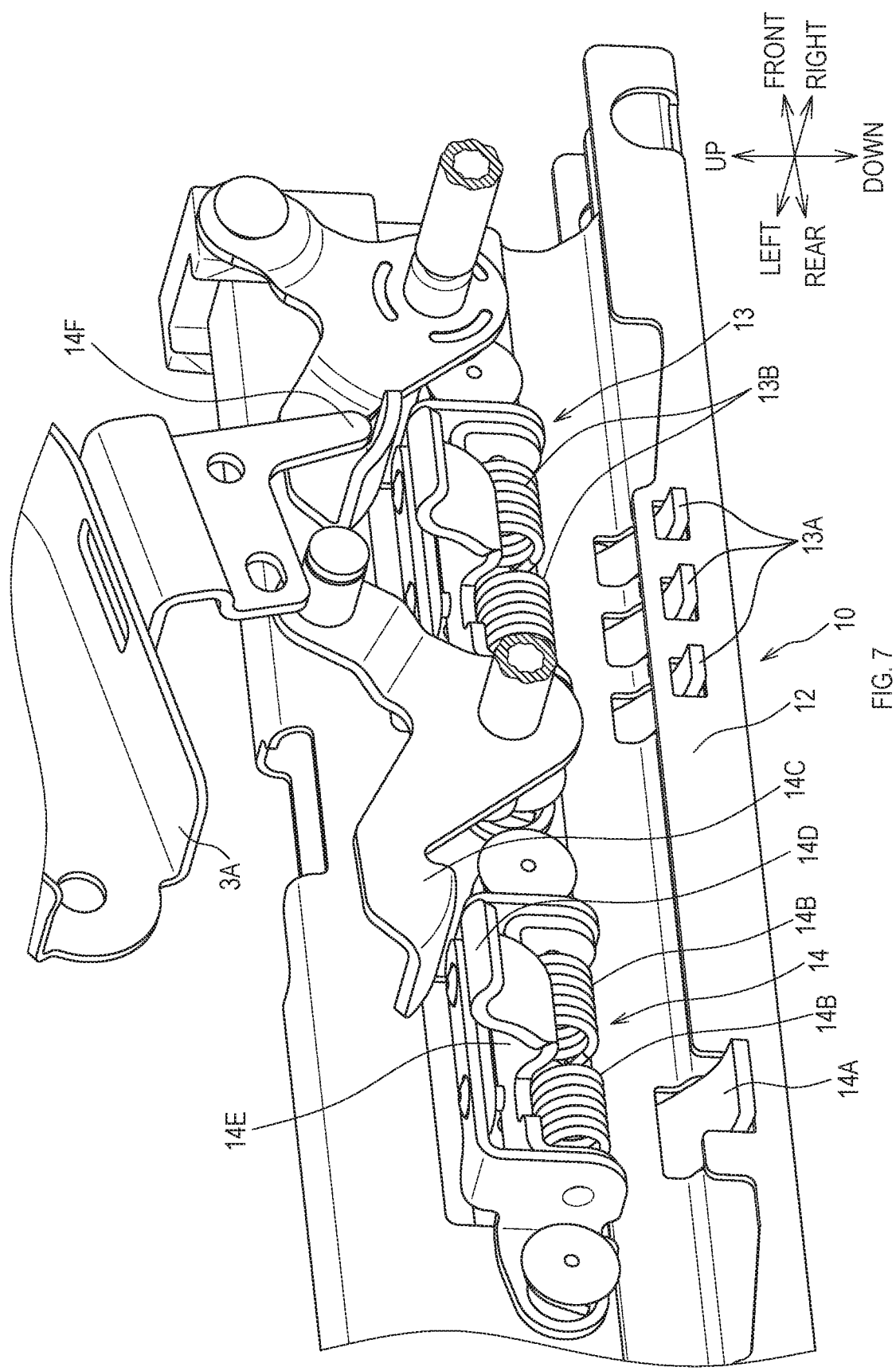
FIG. 7 is a diagram showing the first locking mechanism and the second locking mechanism.

As shown in FIG. 7, the second locking mechanism 14 comprises at least one locking member 14A, at least one spring 14B (in the present embodiment, two or more springs 14B), a release lever 14C, a pressed portion 14D, and a lock-control member 14F.

Figure 4:
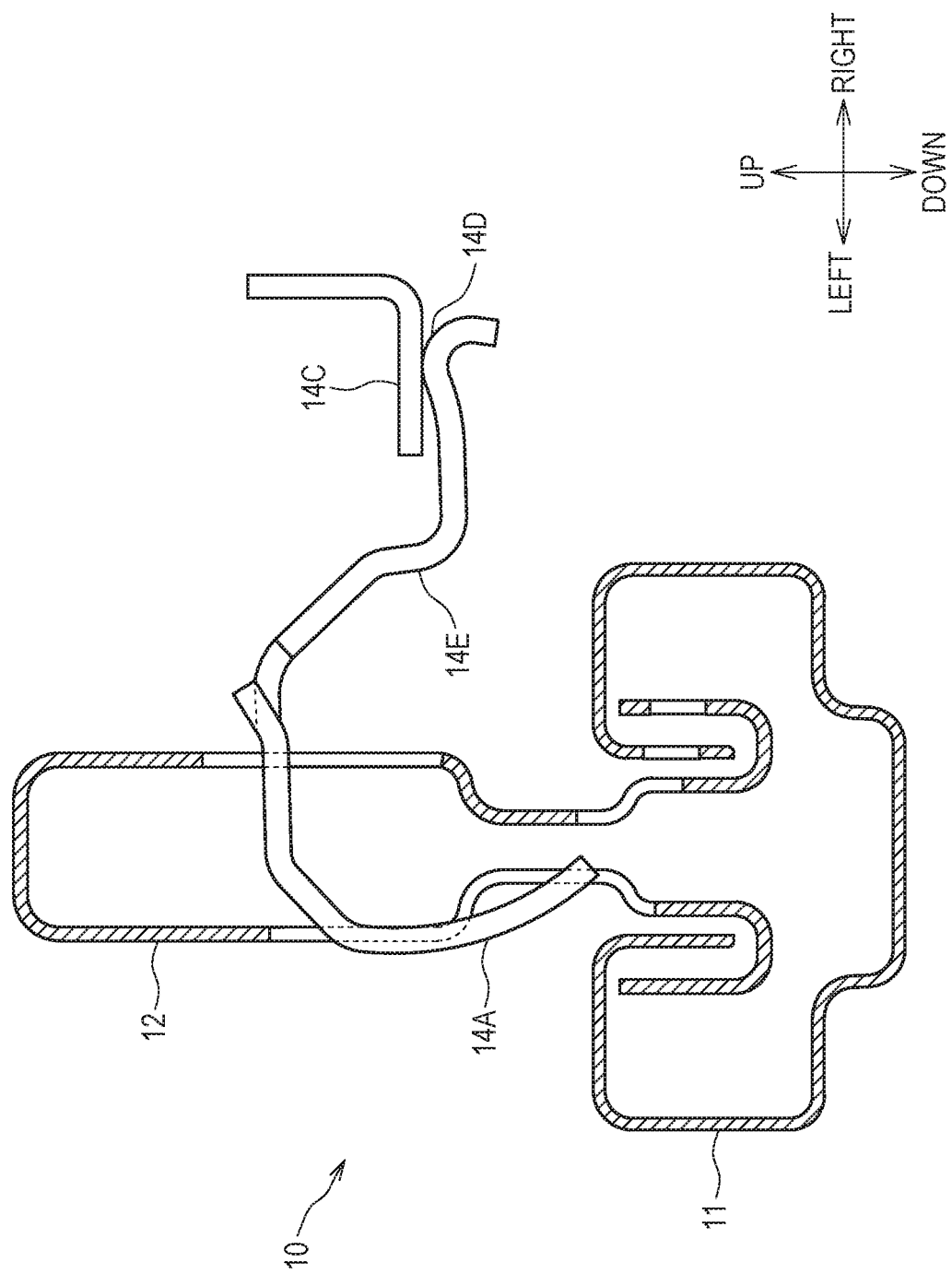
FIG. 4 is a schematic diagram showing a second locking mechanism.
Figure 5:
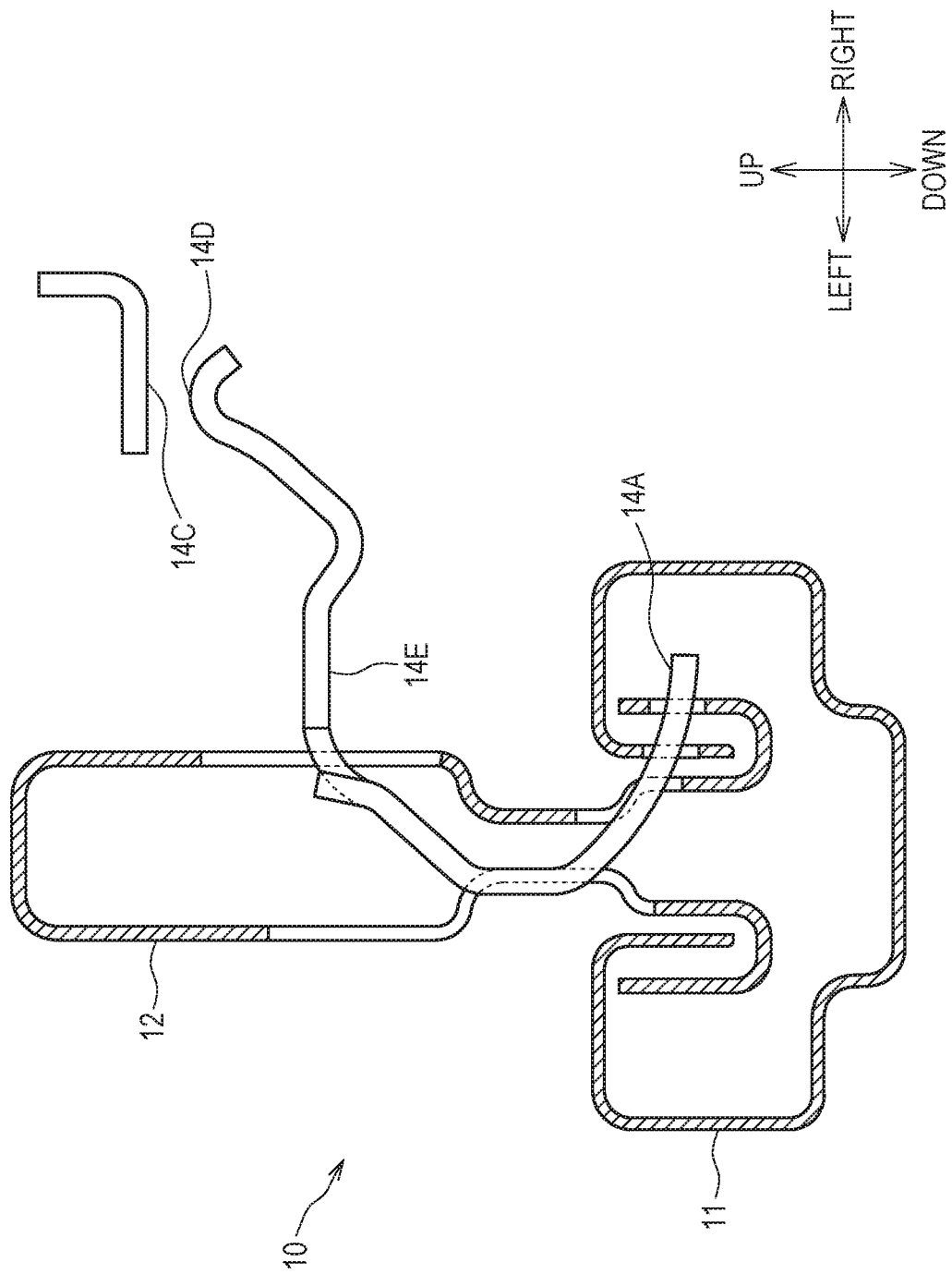
FIG. 5 is a schematic diagram showing the second locking mechanism.

The locking member 14A is displaceable between a second engaged position for engagement with the movable rail 12 and the fixed rail 11 (see FIG. 5) and a second disengaged position where the engagement is released (see FIG. 4). The springs 14B exert elastic forces to displace the locking member 14A towards the second engaged position.

The release lever 14C is displaceable between a second pressing position for pressing the pressed portion 14D (see FIG. 6) and a second separated position spaced apart from the pressed portion 14D (see FIG. 7). The pressed portion 14D is included in a movable member 14E where the locking member 14A is formed (see FIG. 4).

The locking member 14A is displaced into the second disengaged position when the pressed portion 14D is pressed by the release lever 14C (see FIG. 4 and FIG. 6). The locking members 14A are placed back to the second engaged position by the elastic forces of the springs 14B when the release lever 14C is moved apart from the pressed portion 14D (see FIG. 5 and FIG. 7).

The second locking mechanism 14 comprises a spring (not shown) for placing the release lever 14C into the second separated position where the release lever 14C is spaced apart from the pressed portion 14D (see FIG. 7). The release lever 14C contacts the pressed portion 14D in response to receiving a force from the lock-control member 14F (see FIG. 6).

When the lock-control member 14F is moved apart from the release lever 14C, the release lever 14C is placed back to the second separated position spaced apart from the pressed portion 14D by an elastic force of the spring (see FIG. 7). The lock-control member 14F is integrated with the lower arm 3A, in other words, integrated with the seat cushion 3.

Thus, the lock-control member 14F is displaced between position A (see FIG. 6) and position B (see FIG. 7) in conjunction with the movement of the seat cushion 3. The lock-control member 14F placed in the position A causes the release lever 14C to contact the pressed portion 14D.

The lock-control member 14F placed in the position B causes the release lever 14C to move apart from the pressed portion 14D. In the position A, the lock-control member 14F contacts the release lever 14C (see FIG. 6). In the position B, the lock-control member 14F is spaced apart from the release lever 14C (see FIG. 7).

When the elevation angle θ of the seat cushion 3 (see FIG. 1) exceeds a preset angle, the lock-control member 14F is placed in the position B to place the release lever 14C apart from the pressed portion 14D (see FIG. 7). When the elevation angle θ of the seat cushion 3 does not exceed the preset angle, the lock-control member 14F is placed in the position A to move the release lever 14C to contact the pressed portion 14D (see FIG. 6).

Thus, when the elevation angle θ of the seat cushion 3 exceeds the preset angle, the locking member 14A is placed in the second engaged position (see FIG. 7). And when the elevation angle θ of the seat cushion 3 does not exceed the preset elevation angle θ, the locking member 14A is placed in the second disengaged position (see FIG. 6).

3. Characteristics of Vehicle Seat of Present Embodiment

As mentioned above, the second locking mechanism 14 restricts the sliding movement of the seat main body 2 when the elevation angle of the seat cushion 3 exceeds the preset angle.

Accordingly, removal of the restriction of the second locking mechanism 14 is inhibited when the seatback 5 is placed in the occupiable state during the walk-in-ready state of the vehicle seat 1.

Other Embodiments

In the aforementioned embodiment, the lock-control member 14F is configured to be integrated with the lower arm 3A and displaced in conjunction with the movement of the seat cushion 3. Nevertheless, the present disclosure is not limited to such configuration. For example, the lock-control member 14F may also be configured to be displaced in conjunction with the movement of the seat cushion 3 through a link mechanism, a manipulation cable, or the like.

In the aforementioned embodiment, the vehicle seat is configured to be compatible with the walk-in function. Nevertheless, the present disclosure is not limited to such configuration. For example, the vehicle seat may also be configured such that the seat main body can slide frontwards to a large extent when widening a luggage space.

Specific configurations of the first locking mechanism 13 and the second locking mechanism 14 are not limited to the configurations described in the aforementioned embodiment. The first locking mechanism 13 and the second locking mechanism 14 may be configured differently from those in the present disclosure.

The present disclosure may also be applied to seats used in other vehicles, such as railroad vehicles, ships and boats, and aircrafts, as well as built-in seats used in theaters, households, and the like.

Furthermore, the present disclosure should not be limited to the aforementioned embodiments as long as it falls within the spirit of the disclosure described in the aforementioned embodiments. Accordingly, the present disclosure may be configured in combination of at least two of the aforementioned embodiments or may be the aforementioned embodiments configured without either the configuration requirements described in the drawings or the elements described with reference numerals.

What is claimed is:

1. A vehicle seat configured to be mounted to a vehicle, the vehicle seat comprising:
   a seat cushion configured to support buttocks of an occupant and configured to rotate about its rear end in up-down directions;
   a seatback configured to support a back of the occupant and configured to rotate about its lower end in front-rear directions;
   a sliding device configured to slidably support a seat main body that includes the seat cushion and the seatback;
   a first locking mechanism configured to be located on the sliding device and restrict a sliding movement of the seat main body when the seat cushion and the seatback are placed in an occupiable state;
   a tip-up mechanism configured to rotationally displace the seat cushion upwardly from an occupiable position in conjunction with a frontward tilting movement of the seatback;
   a second locking mechanism configured to be located on the sliding device and restrict a sliding movement of the seat main body when an elevation angle of the seat cushion exceeds a preset angle by an operation of the tip-up mechanism, wherein the second locking mechanism is configured to allow the seat main body to slide when the elevation angle of the seat cushion is equal to or less than the preset angle;
   a fixed rail; and
   a movable rail to which the seat main body is fixed and is configured to be slidable with respect to the fixed rail,
   wherein the second locking mechanism comprises
      a locking member configured to be displaced between an engaged position, which is for an engagement with the movable rail and the fixed rail, and a disengaged position where the engagement is released,
      a spring configured to exert an elastic force acting to displace the locking member towards the engaged position,
      a lock-control member configured to be located in the seat cushion, and displace the locking member in the engaged position to the disengaged position, and
      a release lever configured to press the locking member toward the disengaged position by being pressed by the lock-control member on a frontward facing surface of the release lever,
   wherein the release lever is configured to be separated from the lock-control member when the locking member is located in the engaged position, and
   wherein the lock-control member is configured to move rearwards to displace the locking member.

2. The sliding device of claim 1, wherein the lock-control member is configured to:

displace the locking member to the disengaged position when the seat cushion is placed in the occupiable position, and allow the locking member to be placed in the engaged position when the elevation angle of the seat cushion exceeds the preset angle.

3. The sliding device of claim 2, wherein the lock-control member is configured to displace the locking member to the disengaged position when the elevation angle of the seat cushion is equal to or less than the preset angle.

4. The vehicle seat of claim 1, wherein the second locking mechanism is configured to restrict the sliding movement of the seat main body at a position rearward of the first locking mechanism.

* * * * *